United States Patent
Liu et al.

(10) Patent No.: US 8,332,181 B1
(45) Date of Patent: Dec. 11, 2012

(54) SYSTEM AND METHOD FOR ALIGNMENT USING A PORTABLE INERTIAL DEVICE

(75) Inventors: Yong Liu, San Marino, CA (US); A. Dorian Challoner, Manhattan Beach, CA (US)

(73) Assignee: The Boeing Company, Chicago, IL (US)

( * ) Notice: Subject to any disclaimer, the term of this patent is extended or adjusted under 35 U.S.C. 154(b) by 344 days.

(21) Appl. No.: 12/634,529

(22) Filed: Dec. 9, 2009

(51) Int. Cl.
*G01C 9/00* (2006.01)
*G01C 17/38* (2006.01)
*G06F 19/00* (2011.01)

(52) U.S. Cl. .......... 702/150; 345/156; 367/96; 382/103; 439/135; 702/95

(58) Field of Classification Search .................... 702/94, 702/96, 127, 138, 141, 150, 188; 73/514.08, 73/514.12, 514.32; 345/156, 864; 367/96; 382/115, 103
See application file for complete search history.

(56) References Cited

U.S. PATENT DOCUMENTS

| | | | |
|---|---|---|---|
| 7,040,163 B2 | 5/2006 | Shcheglov et al. | 73/504.13 |
| 7,168,318 B2 | 1/2007 | Challoner et al. | 73/504.13 |
| 2003/0095155 A1* | 5/2003 | Johnson | 345/864 |
| 2006/0250894 A1* | 11/2006 | Alliot | 367/96 |
| 2007/0017287 A1 | 1/2007 | Kubena et al. | 73/504.02 |
| 2007/0081695 A1* | 4/2007 | Foxlin et al. | 382/103 |
| 2007/0081696 A1* | 4/2007 | Brennan et al. | 382/115 |
| 2009/0195497 A1* | 8/2009 | Fitzgerald et al. | 345/156 |
| 2010/0216324 A1* | 8/2010 | Lust | 439/135 |

* cited by examiner

*Primary Examiner* — John H Le
(74) *Attorney, Agent, or Firm* — Caven & Aghevli LLC

(57) ABSTRACT

The present disclosure provides a small size hand-held device for aligning two or more structures by attaching the device to master and slave structures and providing real-time position/orientation data to enable the accurate alignment of the structures. The handheld device includes a sensor box containing at least one inertial sensor, such as for example, a gyroscope (such as a disc resonator gyroscope) or an accelerometer. The handheld device further includes an alignment socket designed to mate with an alignment key that may be fixed to the structures to be aligned, and a display for showing a position data output received from the at least one inertial sensor. The handheld device may further include a processor for processing and outputting data to the display and/or the handheld device may include a transmitter for transmitting the data to a central processing unit.

15 Claims, 4 Drawing Sheets

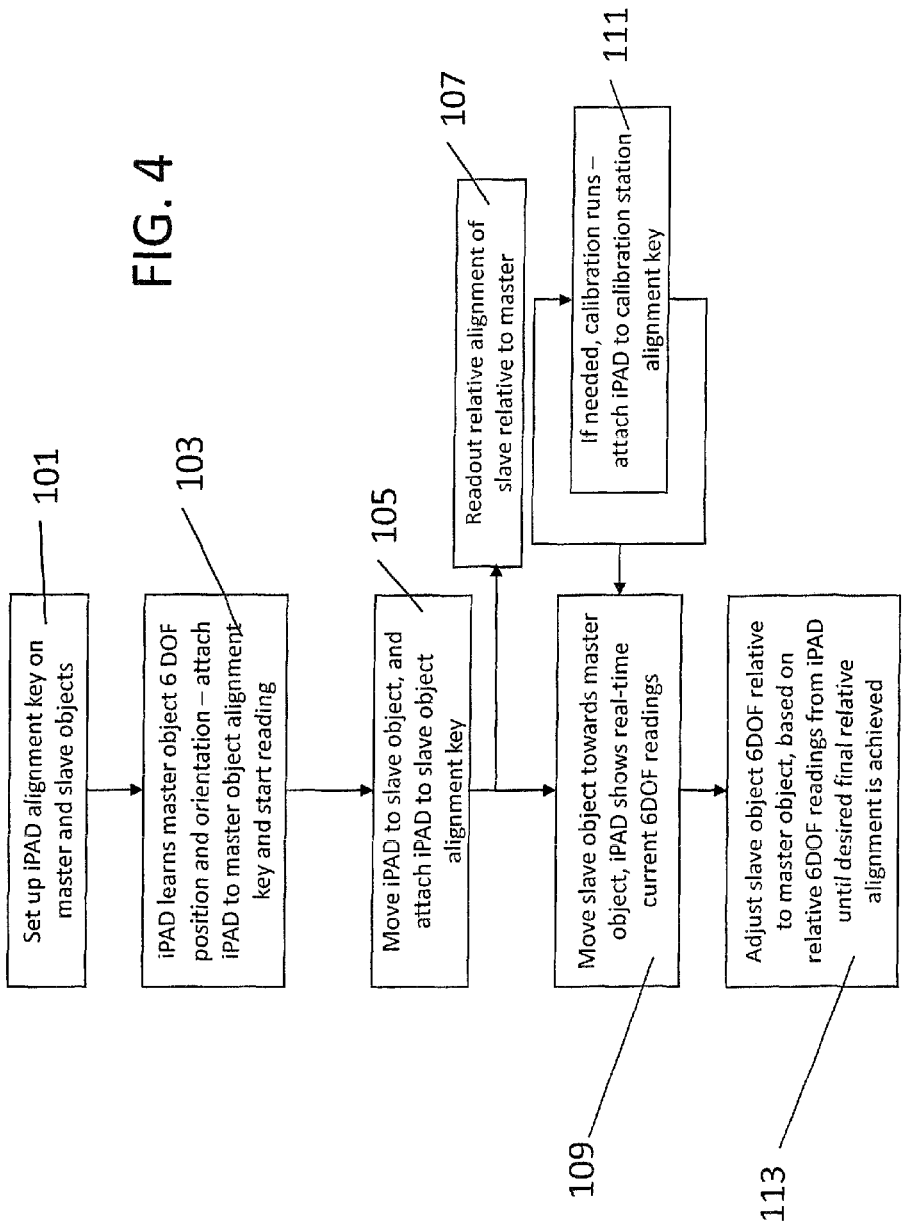

SYSTEM AND METHOD FOR ALIGNMENT USING A PORTABLE INERTIAL DEVICE

FIELD

This present disclosure provides a system and method employing a self-contained, inertial sensor-based alignment tool for 6-DOF (position and orientation) measurement and alignment.

BACKGROUND

In many manufacturing environments, performing relative alignment of parts of components usually require labor intensive alignment system setup, and a direct line-of-sight between master and slave components (if optical alignment tools are used). The methods typically also require training of the personnel performing the alignment tasks and large amount of time for setting up equipment.

Currently, alignments are performed on aircraft and spacecraft manufacturing floors using either optical (laser) alignment tools that are usually large in-size and cannot be used in hard-to-reach locations. These methods are expensive and time consuming and not consistent with lean-manufacturing process.

Inertial sensors, including, for example, accelerometers and gyroscopes, commonly are used to determine direction of a moving platform based upon the sensed inertial reaction of an internally moving proof mass. For example, a typical electromechanical gyroscope comprises a suspended proof mass, gyroscope case, pickoffs, forcers and readout electronics. The inertial proof mass is internally suspended from the gyroscope case that is rigidly mounted to the platform and communicates the inertial motion of the platform while otherwise isolating the proof mass from external disturbances. The pickoffs that sense the internal motion of the proof mass, the forcers that maintain or adjust this motion and the readout electronics that must be in close proximity to the proof mass are internally mounted to the case, which also provides the electrical feedthrough connections to the platform electronics and power supply. The case also provides a standard mechanical interface to attach and align the gyroscope with a moving platform. In various forms, gyroscopes often are employed as a critical sensor for vehicles such as aircraft and spacecraft. They are generally useful for navigation or whenever it is necessary to autonomously determine the orientation of a free object.

Inertial tools are used infrequently in alignment applications. This is probably because most inertial tools are either too large or too expensive. Accuracy also is a common issue with most inertial tools.

SUMMARY

The present disclosure fills the need for a small size handheld device that can perform the required alignment tasks by simply attaching the device to master and slave structures to achieve the required relative alignment of master and slave structure in a timely fashion. The present disclosure largely eliminates the needs of expensive alignment tools and elaborated alignment setups in a manufacturing or other environment where relative alignments of components and parts are critical to the quality of the products (such as aircraft and spacecraft) by making use of inertial referencing capability of accelerometers and gyros, especially the small size MEMS accelerometers and gyros.

One aspect of the present disclosure provides a method for aligning objects into a desired configuration using a portable device. The method is accomplished by first securing an alignment key to an object, which may be a master structure (reference) or a slave structure that is to be moved. The portable device is then attached to the object by mating the alignment key with an alignment socket formed on the portable device. The portable alignment device then learns the position and orientation of the object relative to a reference frame. The data representing the position and orientation of the object is then output to a display and/or a processor and the object is moved into the desired configuration. The movement of the object may be controlled by the processor or carried by a person performing the alignment task.

Another aspect of the present disclosure provides a handheld device for aligning one or more objects in a desired spatial configuration. The handheld device includes a sensor box containing at least one inertial sensor, which may be a MEMS gyroscope (such as a disc resonator gyroscope) and/or a MEMS accelerometer. The handheld device further includes an alignment socket designed to mate with an alignment key that may be attached to an object to be placed in a desired spatial configuration, and a display for showing a position and/or orientation data output received from the at least one inertial sensor. The handheld device may further include a processor for processing and outputting data to the display or the handheld device may include a transmitter for transmitting the data to a central processing unit.

Yet another aspect of the present disclosure provides a system or apparatus for aligning two or more objects into a desired configuration, wherein the objects include a master structure and at least one slave structure. The system includes at least one portable device, the portable device having at least one inertial sensor for determining the relative position of an object attached to the portable device; an alignment key on each of the master structure and slave structure which is formed to mate with a corresponding alignment socket on said portable device; and a processor for storing data representing the desired configuration and for receiving data from the at least one inertial sensor to determine the position of the master structure and the slave structure relative to a reference frame. The portable device may be configured in accordance with the handheld device described above. The system may also include a machine for moving said slave structure into the desired configuration.

The features, functions and advantages that have been discussed can be achieved independently in various embodiments of the present disclosure or may be combined in yet other embodiments further details of which can be seen with reference to the following description and drawings.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 4 is a block diagram of a method for aligning two or more structures in accordance with the present disclosure.

DETAILED DESCRIPTION

In the following description, reference is made to the accompanying drawings, which form a part hereof, and in which is shown, by way of illustration, various embodiments of the present disclosure. It is understood that other embodiments may be utilized and changes may be made without departing from the scope of the present disclosure.

The present disclosure is concerned with relative inertial positioning/orientation of multiple objects as opposed to the navigation of a single body. Relative alignment and positioning/orientation, heretofore done optically or with physical relative position encoders, e.g. ruler or protractor, is fundamental to any human work flow or process, especially involving assembly or manufacturing. The system and method disclosed herein allow the task to be performed without line-of-sight or complicated setup procedures.

The present disclosure provides a system and method for alignment of objects with a reference frame. The disclosure performs the assigned tasks by utilizing at least one portable device containing highly accurate inertial sensors such as gyroscopes and/or accelerometers. The inertial sensors are small, allowing the portable device to be constructed as a hand-held device. The system also includes a processor and a display for calculating the real-time alignment of the device relative to the reference frame. The portable device may be capable of displaying real-time data and/or transmitting that data, via a transmitter, to a central processing unit (CPU) which may display the data. The portable device or the CPU may also control a machine for moving one or more of the objects being monitored by the system.

Figure 1:
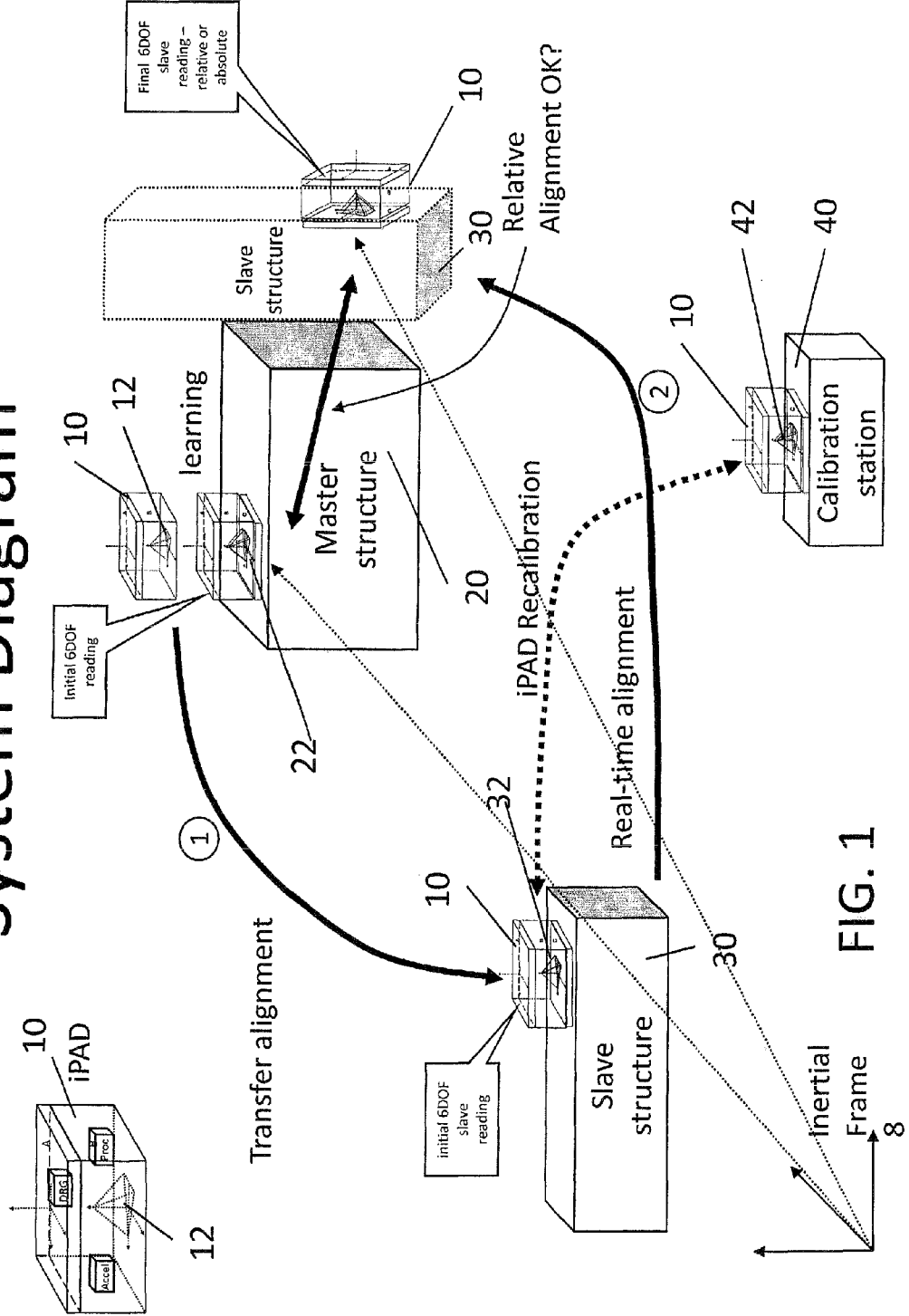
FIG. 1 is a schematic of a system for aligning two or more structures using a portable device in accordance with the present disclosure.

Referring to FIG. 1, the portable device 10 is used to determine the position/orientation of the master structure 20 within the inertial frame 8, which serves as a reference with known position/orientation in an inertial frame or a frame that has a known relationship with the inertial frame (i.e., a pseudo inertial frame). The portable device 10 is then attached to a "slave" structure 30 to determine the position and orientation of the slave structure within the inertial frame. The data may be acquired for one slave structure or several slave structures and may employ one or more portable devices. The system may then proceed to guide the movement and positioning of the slave structure relative to the master structure until a desired alignment is achieved. At any point, the portable device may be recalibrated at a calibration station 40 which also has a known position/orientation in the inertial frame or a pseudo-inertial frame.

Figure 2:
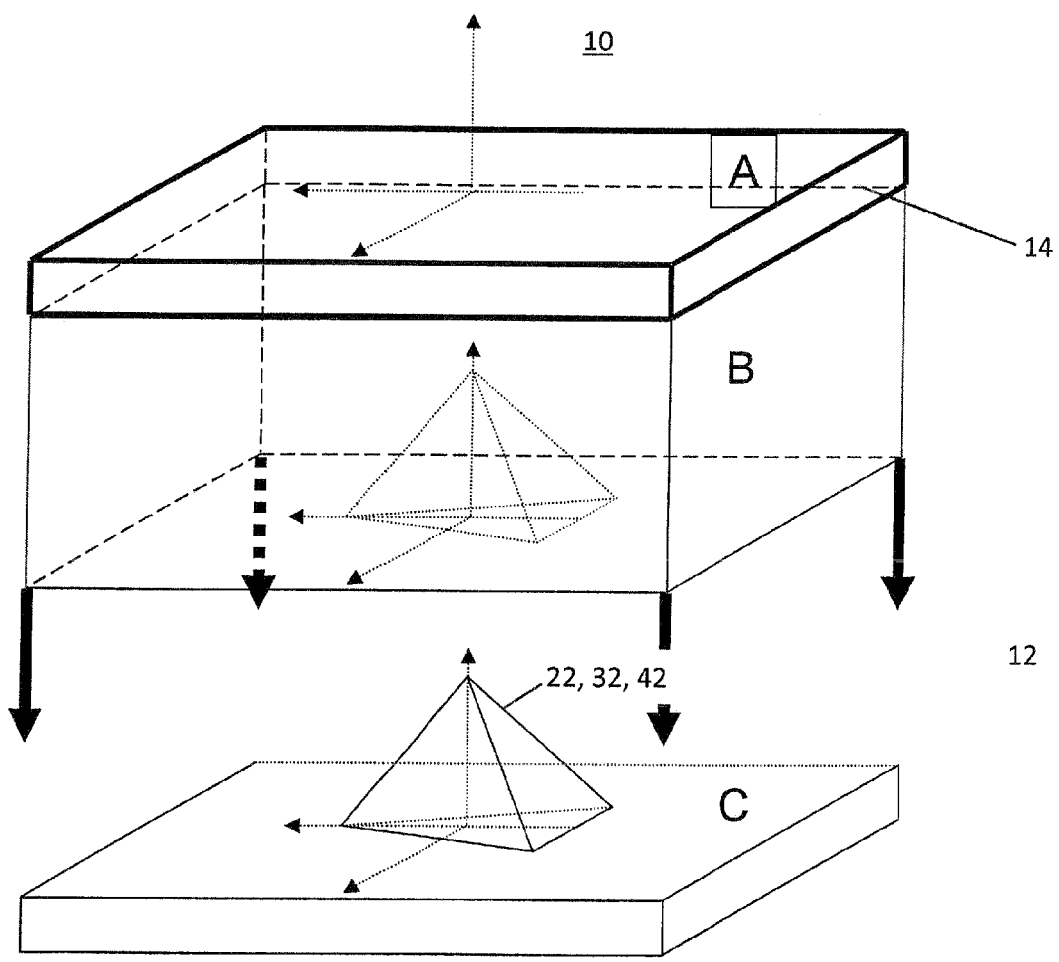
FIG. 2 is a schematic of the portable device shown in FIG. 1.

In order to provide accurate data regarding position and orientation of the various structures, the master and/or slave structures may be provided with a key 22, 32 to guide accurate and consistent placement of the portable device on the respective structure. The portable device 10 may be formed with an alignment socket 12 for mating with the key. In FIGS. 1 and 2, the key is shown protruding from the surface of the structure wherein the alignment socket of the portable device is formed as a recess. Alternatively, the key of the master and slave structures may be formed as a recess wherein the alignment socket protrudes from the portable device. Other design of the key and socket pair can be used and for the purpose of this patent.

The calibration station 40 should also include a key 42 for accurate calibration of the portable device.

The inertial reference frame may be relative or absolute, that is, the inertial reference frame may be constructed to provide data relative to any single point. An absolute reference frame may be employed, e.g., and Earth-Centered, Earth-Fixed (ECEF) Cartesian coordinate system). Relative reference frames may be constructed to refer, for example, to the position of the master structure, the calibration station, the central processing unit, or a building in which the system is contained.

Figure 3:
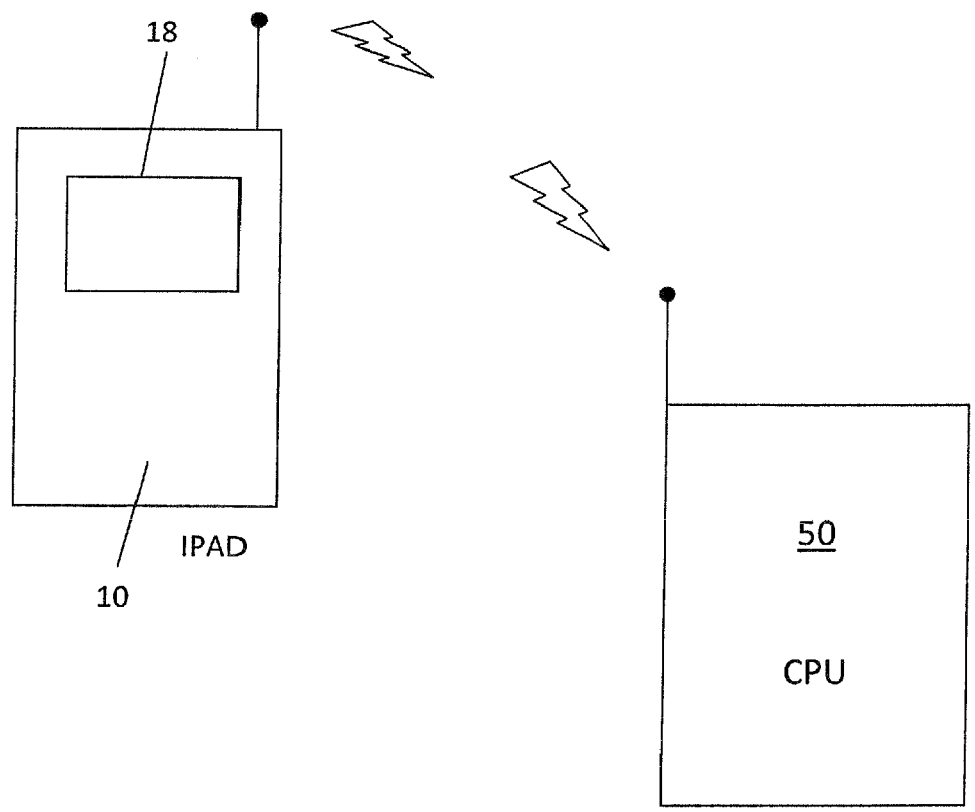
FIG. 3 is a schematic showing the relationship of the portable device to a central processing unit.

The system and method of the present invention may utilize a display screen to assist a user in aligning the slave structure. Referring to FIG. 3, the display 18 may be included on the portable device 10 itself, portraying data on the location/orientation of the master structure and the slave structure(s) relative to the inertial frame and relative to the desired alignment. Alternatively, data may be transmitted from the portable device to the CPU 50 and displayed at that location.

The stand-alone CPU or a processor included in the portable device, either of which should include a data storage system, may compute a prescribed path for each of the slave structures to reach the desired alignment in position and orientation. Movement of each slave structure may occur under human control or automatically, wherein the prescribed path is output by the CPU or portable device to a control device which controls a machine for moving the slave structure.

The accuracy of the system and method disclosed herein depends on the accuracy of the inertial sensors contained in the portable device. The alignment may be accomplished in the blind without the use of tape measures, compasses, theodolites, direct line of sight lasers or other devices dependent on electromagnetic waves or fields. Recent developments have led to significant advances in the size and accuracy of inertial devices. Various types of accelerometers and gyroscopes are appropriate for use with the present disclosure. In particular, see U.S. Pat. No. 7,168,318 and U.S. Publication No. 2007/0017287, commonly owned and incorporated by reference herein.

The system and method of the present disclosure may be used in a wide variety of industries, including, by way of example, aerospace, shipbuilding, automotive, architecture and construction, household applications, land survey, and a variety of other industries.

In a primary example, the portable device 10 of the present disclosure, also called an Inertial Portable Alignment Device (IPAD) is composed of two parts, an alignment socket 12 and a sensor box 14. The sensor box contains, for example, a 3-axis MEMS accelerometer or a 3-axis MEMS gyro. The alignment key 22,32,42, which is designed to mate with the alignment socket, is fixed either on a master structure, on a slave structure or on a periodic calibration station with known inertial location and orientation. By making the IPAD alignment socket to mate with an alignment key, the 6-DOF reference of the alignment key and structure to which the alignment key is attached can be transferred to or "learned" by the IPAD.

The method for aligning objects using an inertial alignment device according to the present invention includes a referencing operation and a measurement operation. Referring to FIG. 4, the referencing operation includes the step of setting up the alignment key on master and slave structures (101). The portable device is then mated to the master structure and learns the position/orientation of the master structure (103). Alternatively, the master structure may have known absolute attitude and position information relative to another reference system (e.g. ECEF) or may be used to establish a relative reference system. According to the present example, the portable device is moved from the master structure to the slave structure over a time ΔT, where the portable device is mated to a similar alignment key attached to the slave structure (105).

Once the position/orientation of the slave structure is known relative to the master structure (107) in real time, the slave object can be guided by the device and maneuvered into the desired alignment (109). Finally, the slave object achieves the desired alignment (113).

Occasional re-calibration of the sensor can be performed to control the size of the time-dependent drift errors if a prolonged period is required to perform alignment operation (111). This can be facilitated by mating the portable device 10 to calibration station 40 and using auxiliary measurement information (zero-speed reset or additional sensors).

The angular and linear motion changes of the portable device can be sensed by the 3-axis gyro and 3-axis accelerometer embedded in the sensor box of the portable device so that the 6DOF information of the slave, either relative to the master alignment key or relative to a third reference frame with which the mater alignment key is referenced to, can be calculated based on the integration of the equation below, assisted by the accelerometer measurements of specific force and gyro measurements of angular rate.

Inertial Frame: $i$

Earth Centered Earth Fixed Frame($ECEF$): $e$

Body Frame: $B$ $$\begin{bmatrix} {}^e\dot{r} \\ {}^e\dot{v} \\ \dot{C}_{eb} \end{bmatrix} = \begin{bmatrix} {}^e v \\ \dot{C}^b_{eb} f - 2[{}^e \omega_{EARTH} \times]{}^e v + {}^e g \\ -C_{eb}[{}^b \omega_{eb} \times] \end{bmatrix}$$

Measurements ${}^b f$: accelerometer specific force ${}^b \omega$: gyro rate

The accuracy of the slave 6DOF knowledge is subject to the accuracy of the employed inertial sensors and the elapsed time ΔT between the referencing operation (putting portable device on the master alignment key) and measurement operation (putting portable device on the slave alignment key). For example, integrating the equation above with a horizontal gyro angle random walk (ARW) of 0.01 deg/rt-h and a horizontal accelerometer velocity random walk (VRW) of 5.9 mm/s/rt-h, a horizontal alignment accuracy of 2.7 mm could be maintained over a 10 m distance between master and slave with an portable device travelling at a rate of 1 m/s in a lean manufacturing operation.

The portable device can also provide real time 6-DOF motion information, relative to the master alignment key, when it is either attached to the slave alignment key or handheld, to provide real-time alignment assistance.

In another example, the alignment key with a matching shape to the alignment socket, is attached to a structure of interest (master, slave or calibration station). When the portable device 10 is mated with an alignment key 22,32,42, a triggering signal is provided by the operator or generated autonomously to start the 6-DOF knowledge transfer which is recorded in a computer either embedded in the portable device or wirelessly transmitted to a centralized computer. The same procedure occurs when the portable device is moved to attach to the slave structure. The 6-DOF from integrating the sensor measurements can be extracted to infer the 6-DOF knowledge of the slave structure, relative to the master alignment key.

It should be emphasized that the above-described embodiments of the present device and process are merely possible examples of implementations and merely set forth for a clear understanding of the principles of the disclosure. Many different embodiments described herein may be designed and/or fabricated without departing from the spirit and scope of the disclosure. All these and other such modifications and variations are intended to be included herein within the scope of this disclosure and protected by the following claims. Therefore the scope of the disclosure is not intended to be limited except as indicated in the appended claims.

The invention claimed is:

1. A method to align a first object with a second object, comprising:
    positioning a portable device at a known position within a reference frame by mating an alignment key of a calibration station with an alignment socket of the portable device in a predetermined location on a calibration station, wherein the portable device comprises an inertial sensor;
    attaching the portable device to a predetermined location on the first object by mating the alignment key of to the first object with an alignment socket formed on the portable device;
    learning a position/orientation of the object relative to a reference frame using the inertial sensor of the portable device;
    moving the portable device from the first object to a predetermined location on the second object by mating an alignment key of the second object with the alignment socket of the portable device;
    determining relative position data relating the relative position of the second device with respect to the first device using the inertial sensor of the portable device; and
    aligning the first object with the second object based on the relative position data.

2. The method of claim 1, wherein the first object is a slave structure and the second object is a master structure.

3. The method of claim 2, further comprising using the relative position data to determine a prescribed path for moving the first structure to align the first structure with the second structure.

4. The method of claim 1, wherein the relative position data is output to a processor which controls a machine for moving the object into the desired configuration.

5. The method of claim 1, wherein the relative position data is output to a display which shows the position of the object in real-time.

6. The method of claim 1, wherein the first object is blindly moved to align the first object with the second object.

7. A handheld device to align a first object with a second object, comprising:
    a sensor box containing at least one inertial sensor;
    an alignment socket in the handheld device to mate with an alignment key;
    a processor coupled to the inertial sensor and configured to:
        determine a calibration position of the handheld device within a reference frame when the handheld device is mated to a calibration station;
        determine a first position of a first object within the reference frame when the handheld device is moved from the calibration position and mated to the first object;
        determine a second position of a second object within the reference frame when the handheld device is moved from the first object and mated to the second object; and a display for showing a relative position data output received from the at least one inertial sensor.

8. The handheld device of claim 7, wherein the at least one inertial sensor includes a MEMS gyroscope and a MEMS accelerometer.

9. The handheld device of claim 7, wherein the at least one inertial sensor includes a disc resonator gyroscope.

10. The handheld device of claim 7, further comprising a processor and a data storage system.

11. The handheld device of claim 7, further comprising a transmitter for transmitting data to a central processing unit.

12. A system to align a first object with a second object, comprising:
- a calibration station comprising an alignment key;
- at least one portable device, the portable device having at least one inertial sensor; and
- a processor coupled to the inertial sensor and configured to:
  - determine a calibration position of the portable device within a reference frame when the portable device is mated to the calibration station;
  - determine a first position of a first object within the reference frame when the handheld device is moved from the calibration position and mated to the first object;
  - determine a second position of a second object within the reference frame when the handheld device is moved from the first object and mated to the second object.

13. The system of claim 12, wherein the at least one inertial sensor includes a gyroscope and an accelerometer.

14. The system of claim 12, wherein the portable device further comprises a transmitter for transmitting the data from the inertial sensor to the processor, which is part of a central processing unit.

15. The system of claim 12, further comprising a machine for moving said slave structure into the desired configuration.

\* \* \* \* \*